US012647066B2

(12) United States Patent
Quan et al.

(10) Patent No.: US 12,647,066 B2
(45) Date of Patent: Jun. 2, 2026

(54) SOLAR TRACKER WITH ROTATION TRANSMISSION SUPPORT

(71) Applicant: TRINA SOLAR, S.L.U., Madrid (ES)

(72) Inventors: Peng Quan, Madrid (ES); Juan Manuel Gómez Garcia, Madrid (ES); Jose Ignacio Lopez Ayarza, Madrid (ES)

(73) Assignee: TRINA SOLAR SPAIN, S.L.U., Madrid (ES)

( * ) Notice: Subject to any disclaimer, the term of this patent is extended or adjusted under 35 U.S.C. 154(b) by 298 days.

(21) Appl. No.: 18/335,359

(22) Filed: Jun. 15, 2023

(65) Prior Publication Data

US 2024/0154566 A1     May 9, 2024

(30) Foreign Application Priority Data

Nov. 7, 2022    (ES) ................................ ES202230956

(51) Int. Cl.
| | |
|---|---|
| *H02S 20/32* | (2014.01) |
| *F24S 25/12* | (2018.01) |
| *F24S 30/425* | (2018.01) |

(52) U.S. Cl.
CPC .............. *H02S 20/32* (2014.12); *F24S 25/12* (2018.05); *F24S 30/425* (2018.05)

(58) Field of Classification Search
CPC ...................................................... H02S 20/32
See application file for complete search history.

(56) References Cited

U.S. PATENT DOCUMENTS

| | | |
|---|---|---|
| 2014/0209146 A1 | 7/2014 | Park et al. |
| 2015/0000721 A1 | 1/2015 | Au |
| 2017/0237391 A1* | 8/2017 | Michotte De Welle .................... F24S 30/425 248/372.1 |
| 2021/0124007 A1 | 4/2021 | Pesce et al. |

FOREIGN PATENT DOCUMENTS

| | | |
|---|---|---|
| CN | 213342122 U | 6/2021 |
| EP | 1989495 A1 | 11/2008 |
| EP | 2645012 A1 | 10/2013 |
| ES | 2923137 T3 | 9/2022 |

OTHER PUBLICATIONS

CN 103380332 A English Translation, provided by FIT database.*
Oficina Española de Patentes y Marcas, Search Report issued in the related Spanish Patent Application No. 202230956, dated Jan. 12, 2023, 4 pages.

* cited by examiner

*Primary Examiner* — Golam Mowla
(74) *Attorney, Agent, or Firm* — LUCAS & MERCANTI, LLP

(57) ABSTRACT

A solar tracker having at least one post (7) for fixing to the ground at least one solar panel (8) that rotates by action of a drive, which has a rotation transmission support (1) on which the solar panel (8) is supported and which is coupled to the post (7) in such a way that it slides along a horizontal guide rail (2) fixed to the post (7) by a guide element (3), and the rotation transmission support (1) rolling on a rolling contact element (4) fixed to the post (7) to establish the rotation of the solar panel (8) in both directions.

8 Claims, 6 Drawing Sheets

SOLAR TRACKER WITH ROTATION TRANSMISSION SUPPORT

CROSS-REFERENCE TO RELATED APPLICATION

This application claims the benefit of priority from Spanish Patent Application No. P 202230956, filed Nov. 7, 2022, the contents of which are incorporated herein by reference.

TECHNICAL FIELD

The present invention relates to solar trackers supporting one or more photovoltaic solar panels, which trackers orient the solar panels by making them rotate so that the sun's rays strike them perpendicularly.

BACKGROUND OF THE INVENTION

Solar trackers with a single rotating shaft with a support structure for the solar panel are known, with said rotating shaft being fixed to posts anchoring to the ground by means of bearings. Said rotating shaft transmits the rotational movement to the solar panels by action of a rotation module that causes the rotation of the shaft that supports the panels, or by means of a linear drive that transmits the rotation directly to the solar panels, but in a uniform manner as a result of the rotating shaft that supports them.

These embodiments have the problem that the further the horizontal rotating shaft is from the center of gravity of the assembly, the eccentricity increases, that is, the efforts to be provided to rotate the assembly will be higher, offsetting the moment created by said eccentricity, which results in a moment of force added to the rotational effort of the solar panel.

Another problem that arises is that, upon reaching the maximum rotation of the panel, and taking into account that the eccentricity is greater at that point and therefore so is the effort as well, upon braking, the load on the drives is very high, which reduces its service life and can even cause breakdowns.

In view of the described drawbacks or limitations of the currently existing solutions, a solution that allows reducing the efforts to be provided to rotate the solar tracker assembly, while reducing the load on the drives at the time of braking, is necessary.

SUMMARY OF THE INVENTION

In order to meet this objective and solve the technical problems discussed thus far, in addition to providing additional advantages that can be derived later, the present invention provides a solar tracker that comprises at least one post for fixing to the ground at least one solar panel that rotates by action of a drive, which comprises a rotation transmission support on which the solar panel is supported and which is coupled to the post in such a way that it slides along a horizontal guide rail fixed to the post by means of a guide element, and said rotation transmission support rolling on a rolling contact element fixed to the post to establish the rotation of the solar panel in both directions.

Said rolling occurs continuously, thus achieving a continuity in rotation that causes smoother movements that require less effort from the drive.

Another important advantage is that the eccentricity created by the displacement of the center of gravity of the solar panel is reduced, since the horizontal displacement of the solar panel is less, and there is an additional support point, one on the guide rail, and another at the point of contact with the rolling contact element. In this way, the efforts that the drive must make to offset the moments created by said eccentricity are reduced, consequently reducing the energy necessary for the operation of the installation, even reducing the costs of the installation itself by needing less powerful motors, in addition to increasing the useful life and safety of the installation.

According to one feature of the invention, the rotation transmission support comprises a central projection that projects perpendicular to the plane of the solar panel in its mounting position, and in the direction of the post for anchoring to the ground. Said projection is configured to contact the rolling contact element and roll on its surface to cause the rotation of the solar panel.

Preferably the rolling element has a U-shaped geometry with a curved surface in correspondence with a curved surface of the projection, and more preferably the projection of the rotation transmission support having a cylindrical surface in correspondence with a cylindrical surface of the ends of the U-shaped rolling contact element to cause continuous rolling.

As a result of this configuration, a large rotational movement is obtained with a smaller linear movement, requiring less effort in the rotation drive of the solar tracker.

According to another feature of the invention, the rotation transmission support comprises a rolling stop on each side of the projection that establishes a rotation stop in contact with the surface of the rolling contact element. The load on the drives is thereby minimized at times when braking is required.

According to another aspect of the invention, the rotation transmission support is made up of two parts, the horizontal guide rail being secured between same. Each part of the support will have its corresponding projection and its rolling contact element. In this way, there is a better distribution of efforts and a more robust arrangement is achieved against possible efforts from the wind.

Additionally, the solar panel preferably has two supports at its ends with a rotation transmission support on each support post for rotation thereof, so that the solar panel is directly supported on the rotation transmission support which transmits rotational movement thereto. Therefore, the rotating shaft is dispensed with, which reduces material costs and facilitates installation, as well as reducing eccentricity by positioning the solar panel closer to the post for anchoring.

DETAILED DESCRIPTION OF THE INVENTION

In view of the aforementioned figures, and in accordance with the adopted numbering, one may observe therein a non-limiting practical exemplary embodiment of the invention, which comprises the parts and elements indicated and described in detail below.

Figure 1:
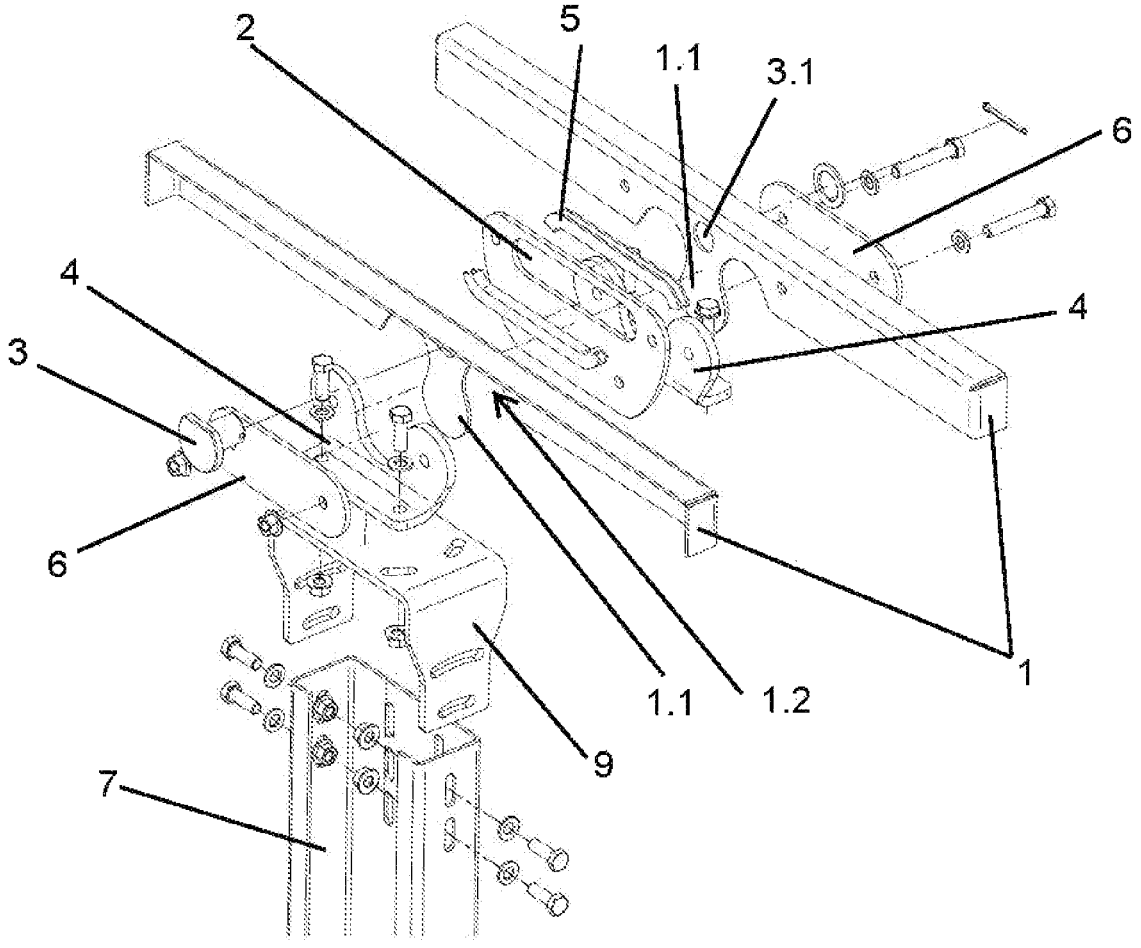
FIG. 1 shows an exploded perspective detail view of the solar tracker object of the invention, in which the solar panel has been omitted for better visualization.

As can be seen in the practical embodiment of FIG. 1, in this case the rotation transmission support (1) is divided into two symmetrical parts. In this way, a post (7) for anchoring to the ground is fixed to a post support (9) that serves as a support for fixing a rolling contact element (4), in this case two rolling contact elements (4) in correspondence with each part of the rotation transmission support (1).

Thus, the rolling contact element (4) is in the form of an L-shaped plate the lower wing of which allows it to be fixed to the post support (9), and its upper wing is U-shaped with a continuous perimetral rolling surface with the ends having a cylindrical configuration, like the intermediate gap, also having a cylindrical configuration. A projection (1.1) that projects from the central area of the rotation transmission support (1) is supported on said rolling surface of the rolling contact element (4), the surface of said projection (1.1) having a curvature in correspondence with the rolling surface of the rolling contact element (4), and more specifically having a cylindrical configuration, with an initial narrowing in accordance with the change in curvature for its adaptation to the rolling surface of the rolling contact element (4) during the rotation. As previously mentioned, the other part of the rotation transmission support (1) and its corresponding rolling contact element (4) having a symmetrical configuration are arranged adjacently.

Figure 2:
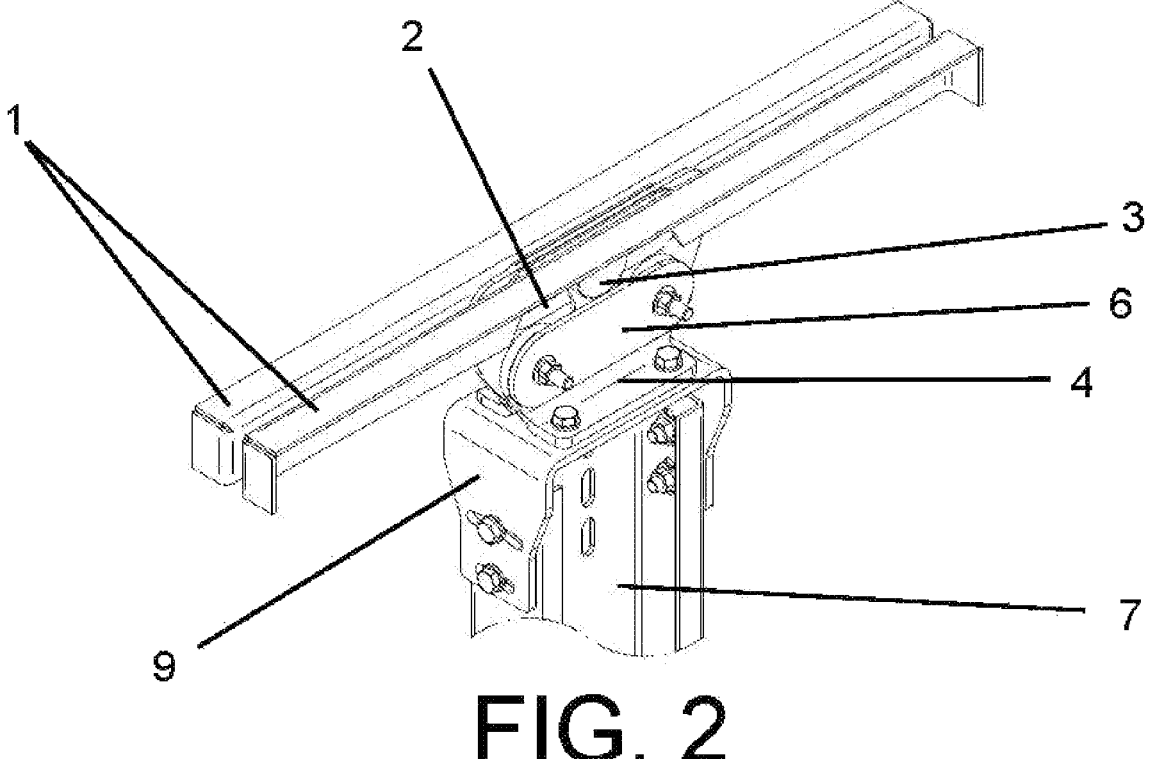
FIG. 2 shows a perspective view of a rotation transmission support in its assembled position on the post for anchoring to the ground.

Between both parts of the rotation transmission support (1) there is an element in the form of a flat bar comprising a horizontal guide rail (2). This guide rail (2) is fixed to both rolling contact elements (4), as can be seen in FIG. 2, so that it remains fixed to the post (7).

To establish the guidance of the rotation transmission support (1), a guide element (3), in this case in the form of a bolt, is passed through a hole (3.1) of the rotation transmission support (1). To establish complete fixing and secure the assembly, the entire assembly is fixed in the form of a sandwich with a closing plate (6) on each side.

Figure 3:
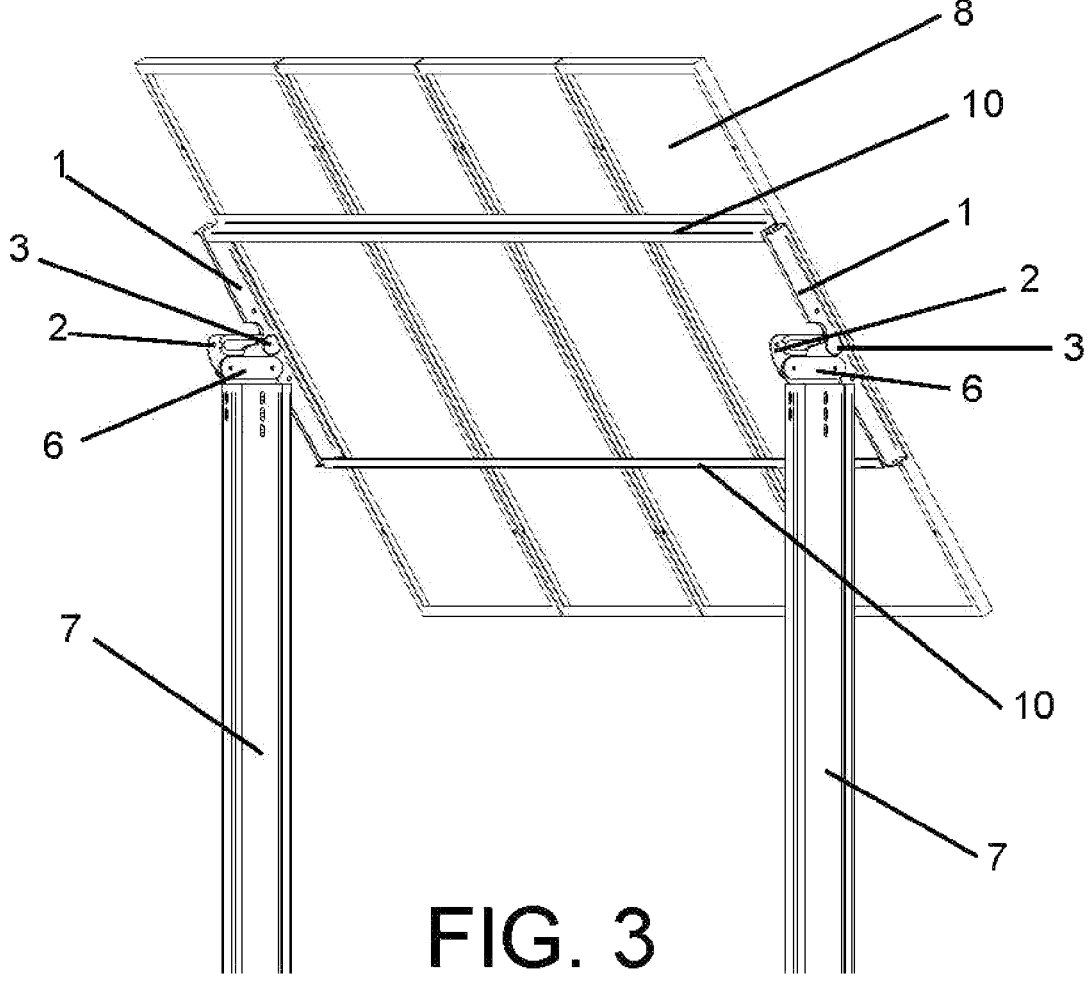
FIG. 3 shows a perspective view of the solar tracker object of the invention, fully assembled and with the panel in its extreme rotation position.

Once the rotation transmission support (1) is installed on the posts (7), the solar panel (8) is fixed on said support (1), preferably having two supports, as can be seen in FIG. 3, so that there are two posts (7) at each end of the solar panel assembly (8) with a double rotation transmission support (1) fixed on each post (7). In this way, the support (1) itself transmits a continuous rotational movement while maintaining continuous rolling. To reinforce the securing, the solar panel (8) is intended to be arranged on at least two straps (10) fixed to the rotation transmission support (1), creating a robust structure that does not need a rotating shaft (11).

This guiding configuration in combination with rolling allows linear movement to be transformed to rotation, since in the horizontal translation of the rotation transmission support (1) on the guide rail (2), upon contact of the projection (1.1) with the rolling contact element (4), it forces the support (1) to rotate by rolling on said rolling contact element (4). In this way, a large rotational movement is obtained with a smaller linear movement.

Figure 4:
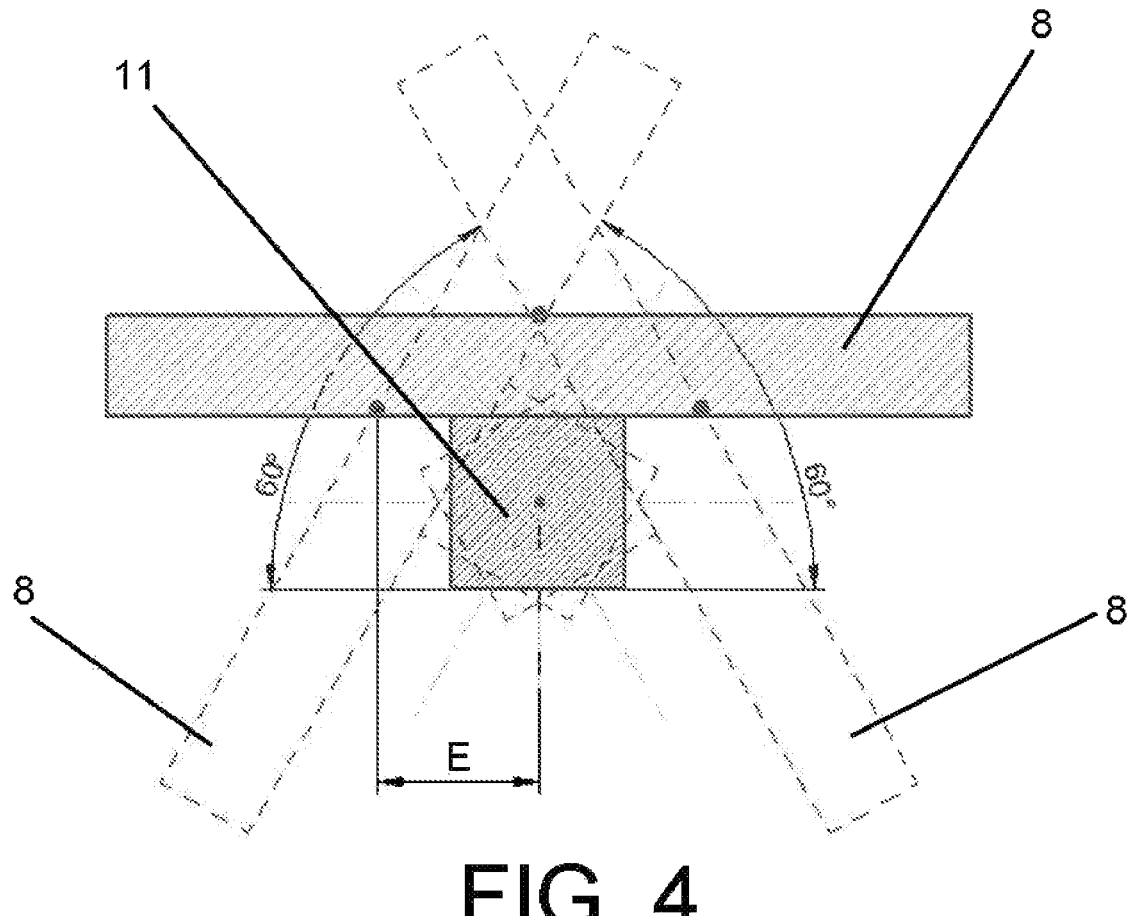
FIG. 4 shows a schematic view of the rotation of a solar tracker from the prior art, indicating the solar panel at its points of maximum rotation with dashed lines.
Figure 5:
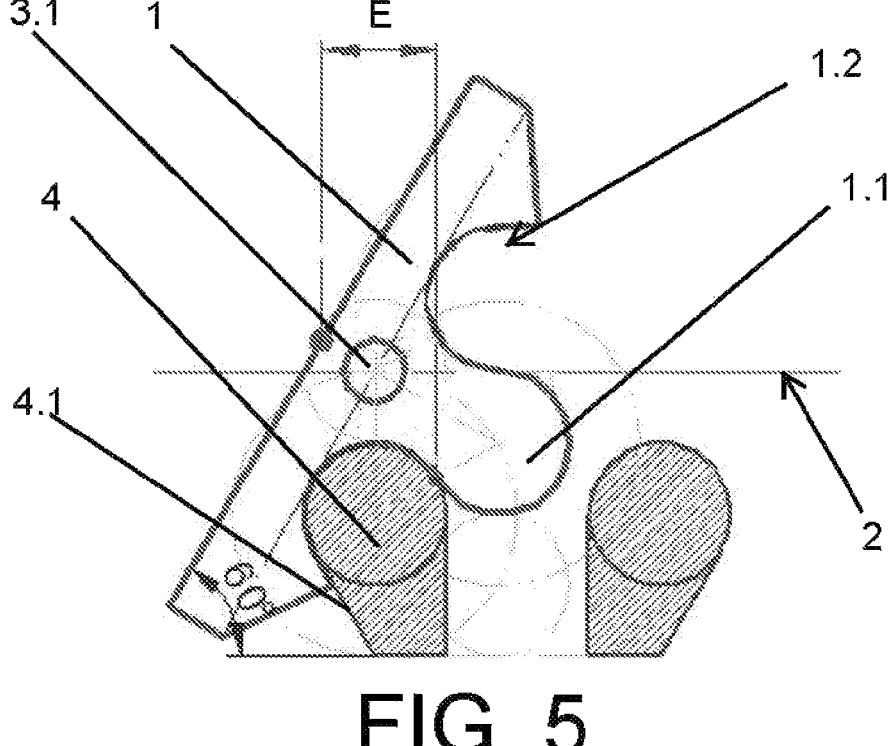
FIG. 5 shows a schematic view of the solar tracker object of the invention in comparison with FIG. 4.

FIGS. 4 and 5 show a comparison of the eccentricity caused by the displacement of the center of gravity of the solar panel (8), in the case of FIG. 4 for a solar tracker from the prior art comprising a rotating shaft (11) where eccentricity (E) is represented at the point of maximum rotation of the solar panel (8), in which a moment of force is created between the support in the center of the rotating shaft (11) and the center of gravity of the solar panel (8), which must be offset by the drive. However, FIG. 5 shows, schematically for the practical embodiment shown in the figures, how at the point of maximum rotation of the solar panel (8) (not depicted) the support point will be the contact point of the rotation transmission support (1) with the rolling contact element (4), the eccentricity (E) of the center of gravity of the solar panel (8) thus being reduced and therefore requiring less additional effort from the drive of the solar tracker. In addition, there is another support point for the distribution and offsetting of forces that is derived from the contact of the guide element (3) on the horizontal guide rail, which requires less effort from the drive to apply the rotation of the solar tracker.

Likewise, the continuous contact between the surface of the rolling contact element (4) and the surface of the projection (1.1) of the rotation transmission support (1) makes the rolling movement also reduce the necessary effort to be applied from the drive to apply the rotation of the solar tracker.

The guide rail (2) is further intended to comprise a slide (5) so that the friction of the bolt (3) in its guiding displacement is less, thus reducing the resistance in movement, in addition to reinforcing said guide rail (2) to prevent breakage and even allow replacement due to wear of the slide (5).

Figure 6:
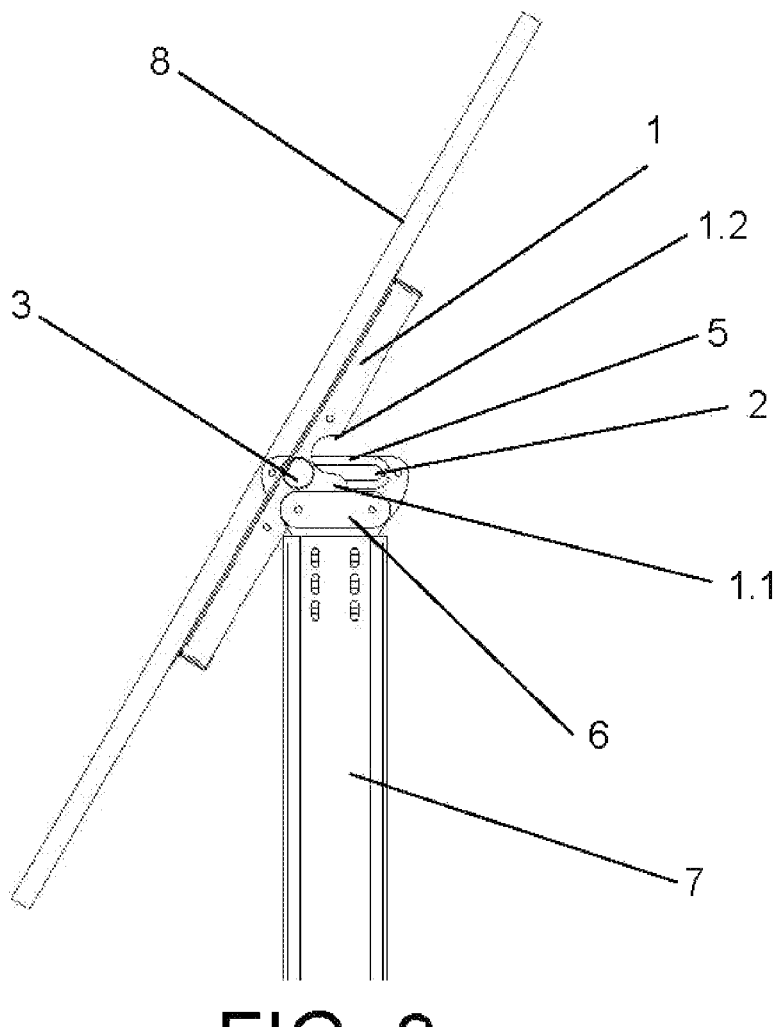
FIG. 6 shows a detailed elevational view of the solar panel mounted on the rotation transmission support at one of its points of maximum rotation.

According to an additional feature, the rotation transmission support (1) comprises a rolling stop (1.2), in this case, as can be seen in FIGS. 5 and 6, in the form of a groove that ends in a smooth surface in correspondence with a smooth surface following the curvature of the rolling contact element (4) which, in the position of maximum rotation of the solar tracker, establishes a rotation stop, which minimizes the load on the drives at times when braking is required.

The invention claimed is:

1. A solar tracker comprising at least one post (7) for fixing to a ground at least one solar panel (8) that rotates by action of a drive, a rotation transmission support (1) on which the at least one solar panel (8) is supported and coupled to the at least one post (7) and configured to slide in a linear movement along a horizontal guide rail (2) fixed to the post (7) by means of a guide element (3), and said rotation transmission support (1) rolling around the guide element (3) on a rolling contact element (4) fixed to the post (7) to establish the rotation of the at least one solar panel (8) in both directions around the guide element (3).

2. The solar tracker according to claim 1, wherein the rotation transmission support (1) comprises a central projection (1.1) that projects perpendicular to a plane of the at least one solar panel (8) towards the at least one post (7), wherein the central projection (1.1) is configured to contact the rolling contact element (4) and roll on its surface to cause the rotation of the at least one solar panel (8).

3. The solar tracker according to claim 2, wherein the rolling contact element (4) has a U-shaped geometry with a curved surface in correspondence with a curved surface of the central projection (1.1) to cause rolling.

4. The solar tracker according to claim 3, wherein a surface of the rotation transmission support (1) in contact with the rolling contact element (4) is cylindrical and in correspondence with the surface of two ends of the U-shaped rolling contact element (4).

5. The solar tracker according to claim 2, wherein the rotation transmission support (1) comprises a rolling stop (1.2) on each side of the central projection (1.1) that establishes a rotation stop in contact with a surface of the rolling contact element (4).

6. The solar tracker according to claim 1, wherein the rotation transmission support (1) is made up of two parts, the horizontal guide rail (2) being secured between same.

7. The solar tracker according to claim 1, wherein the solar panel (8) has two posts (7) at its ends comprising a rotation transmission support (1) on each of the two posts (7) for rotation thereof.

8. The solar tracker according to claim 1, wherein the horizontal guide rail (2) comprises a slide (5) on which the guide element (3) slides.

\* \* \* \* \*